Patented Mar. 24, 1953

2,632,687

UNITED STATES PATENT OFFICE 2,632,687

PREPARATION OF CALCIUM CYANAMIDE

Henry A. Walter, Longmeadow, Mass., assignor to Monsanto Chemical Company, St. Louis, Mo., a corporation of Delaware No Drawing. Application September 30, 1948, Serial No. 52,121

3 Claims. (Cl. 23—78)

This invention relates to a process for the preparation of calcium cyanamide. More particularly, the invention relates to a process for the preparation of calcium cyanamide from urea and calcium oxide.

The preparation of calcium cyanamide from calcium carbide has long been a method for the fixation of nitrogen from the air. It is a relatively quick and cheap method, but has the disadvantage that the products are generally black in color due to many by-products, especially carbon. Attempts to purify the black reaction product have resulted in costly processes and low yields.

A second method for the preparation of calcium cyanamide is the reaction between urea and calcium oxide. This process gives a purer product, but the yield of calcium cyanamide has been low.

It is an object of this invention to provide a process for the preparation of calcium cyanamide.

A further object is to provide a process for increasing the yield of calcium cyanamide prepared by the reaction between calcium oxide and urea.

These and other objects are attained by reacting urea with calcium oxide in the presence of calcium chloride.

The following examples are given in illustration and are not intended to limit the scope of this invention. Where parts are mentioned, they are parts by weight.

Example I

A mixture of 230 parts of calcium oxide, 450 parts of urea and 68 parts of anhydrous calcium chloride was heated at 1600° F. for about 1 hour. The product was a relatively white solid. On analysis, it was found to contain 16 parts of cyanamide nitrogen for each 100 parts of product. This corresponds to a 46% yield of calcium cyanamide. The calcium cyanamide could be obtained in the pure state from the product by selective solvation.

Example II

A mixture of 230 parts of calcium oxide and 450 parts of urea was heated at about 1600° F. for about 1 hour to yield a relatively fluffy white solid material. The analysis showed 9.8 parts of cyanamide nitrogen for each 100 parts of product. This corresponds to a 28% yield of calcium cyanamide and is in strong contrast to the yield obtained in Example I.

The temperature of the reaction may be varied between 1000° F. and 2000° F., but, for optimum yields, should be maintained between 1500° F. and 1700° F. The duration of the reaction will depend on the temperature, ranging from 15 minutes at 1900–2000° F. to 90 minutes at 1000–1200° F. At the optimum temperature the reaction should be continued for from 50 to 70 minutes.

The amount of the three reactants may be substantially varied. Based on 100 parts of calcium oxide, the urea may be used in amounts varying between 120 and 250 parts and the calcium chloride may be used in amounts varying between 11 and 110 parts. All of the reactants should be in substantially anhydrous condition at the start of the reaction. For optimum yields, for 100 parts of calcium oxide, the amount of urea should be limited to from 160 to 270 parts and the calcium chloride to from 20 to 50 parts.

The calcium oxide may be replaced in whole or in part by other calcium compounds such as calcium carbonate, calcium cyanate, calcium oxalate, etc.

The calcium chloride may be replaced in whole or in part by other calcium halides such as calcium fluoride, calcium bromide or calcium iodide or by the halides of other alkaline earth metals such as the halides of strontium and barium.

The urea may be replaced in whole or in part by such nitrogen-containing compounds as carbamic acid, cyanuric acid, biuret, guanidine carbonate, dicyandiamide, etc.

The process of this invention provides a method for preparing calcium cyanamide in substantially increased yields from calcium oxide and urea. It further provides a product that may be more easily purified than the product obtained by the more common calcium carbide reaction. In addition, the impurities contained in the product before purification are such that the impure product may be used for many chemical reactions without purifying it.

It is obvious that many variations may be made in the products and process of this invention without departing from the spirit and scope thereof as defined in the appended claims.

What is claimed is:

1. A process for the preparation of calcium cyanamide which consists of reacting 100 parts of calcium oxide with from 120 to 350 parts of urea in admixture with from 11 to 110 parts of calcium chloride at temperatures ranging from 1000° F. to 2000° F. for a period of time ranging from 15 minutes at 2000° F. to 90 minutes at 1000° F., all of the initial reactants being in substantially anhydrous condition, and recovering solid calcium cyanamide.

2. A process for the preparation of calcium cyanamide which consists of reacting 100 parts of calcium oxide with from 160 to 270 parts of urea in admixture with from 20 to 50 parts of calcium chloride at temperatures ranging from 1500° F. to 1700° F. for a period of time ranging from 50 to 70 minutes, all of the initial reactants being in substantially anhydrous condition, and recovering solid calcium cyanamide.

3. A process for the preparation of calcium cyanamide which consists of reacting 230 parts of calcium oxide with 450 parts of urea in admixture with 68 parts of calcium chloride at 1600° F. for 60 minutes, all of the initial reactants being in substantially anhydrous form, and recovering solid calcium cyanamide.

HENRY A. WALTER.

REFERENCES CITED

The following references are of record in the file of this patent:

UNITED STATES PATENTS

| Number | Name | Date |
|---|---|---|
| 1,021,445 | Bonnington et al. | Mar. 26, 1912 |
| 1,842,018 | Germann | Jan. 19, 1932 |

FOREIGN PATENTS

| Number | Country | Date |
|---|---|---|
| 279,811 | Great Britain | Nov. 15, 1928 |
| 608,621 | Germany | Jan. 29, 1935 |
| 641,818 | Germany | Feb. 13, 1937 |

OTHER REFERENCES

Karrer, "Organic Chemistry," 2nd Ed. pages 217–219, published by Elsevier Publ. Co., Inc., N. Y. C., 1946.